United States Patent [19]

Podgorski

[11] Patent Number: 4,740,985
[45] Date of Patent: Apr. 26, 1988

[54] GETTER ASSEMBLY

[75] Inventor: Theodore J. Podgorski, Maplewood, Minn.

[73] Assignee: Honeywell Inc., Minneapolis, Minn.

[21] Appl. No.: 948,267

[22] Filed: Dec. 31, 1986

[51] Int. Cl.$^4$ ............................................. H01S 3/097
[52] U.S. Cl. ........................................ 372/87; 372/59;
372/94; 372/33; 313/549; 313/558; 313/561;
313/562; 356/350
[58] Field of Search ...................... 372/94, 33; 322/87,
322/88, 59; 313/542, 549, 558, 561; 356/350

[56] References Cited

U.S. PATENT DOCUMENTS 4,503,543  3/1985  Ljuno et al. ......................... 372/94

Primary Examiner—Leon Scott, Jr.
Attorney, Agent, or Firm—Robert A. Pajak

[57] ABSTRACT

In the present invention, a getter assembly is formed by a housing containing a cavity in which the passageway into the cavity is covered by an end cover which is permeable to selected gases. Internal to the cavity formed by the housing is an activated getter material for eliminating selected gas contaminants within the cavity.

5 Claims, 1 Drawing Sheet

GETTER ASSEMBLY

This invention relates to a getter assembly for removing contaminant gases contained in the lasing gas of a laser, and more particularly to a getter assembly for a ring laser angular sensor.

Getters, and particularly getter materials, are well known as applied in high vacuum gases. Alkaline earth materials, commonly Barium, are widely used as getters to scavenge residual gases in such high vacuum devices. Because of the extreme reactiveness of these materials with air, commercially available getter materials are usually alloyed with other materials, such as aluminum, in order to reduce their reactiveness to common gases found in air such as hydrogen and the like.

Getter materials and getter techniques are commonly employed in lasers in which the lasing cavity is first evacuated of all gas, and then filled with a lasing gas such as helium, neon, or a combination thereof. Unfortunately, the lasing gas found in such cavities will contain some impurity gases. Therefore, the use of getters and getter techniques are commonly employed.

Ring laser angular rate sensors, employing a ring laser cavity, are particularly affected by contamination of the lasing gas. Ring laser angular the rate sensors are well known in the art and are particularly described in U.S. Pat. No. 3,373,650 and 3,467,472, both of which are issued to Killpatrick, and U.S. Pat. No. 3,390,606 issued to Podgorski, each of these patents being assigned to the assignee of the present invention, and are herein incorporated by reference.

In some ring laser angular rate sensors, a getter assembly consisting of a snap ring welded to a getter pin containing the getter material is clamped inside the ring laser cavity. The getter material is flashed and the sensor cavity is closed off at its pinch tube, leaving the getter assembly inside the lasing cavity. This system has several disadvantages. Particles shed from the delivery system due to shock, vibration, and/or temperature variations, can contaminate the sensor and reduce its useful life. Further, a certain amount of contaminated gas is emitted from the getter material just before it flashes. Also, some contaminant gases may be rubbed off during insertion of the getter delivery system into the sensor.

Another technique for introducing a getter into the ring laser cavity is particularly described in U.S. Pat. No. 4,530,854, issued to Meyerhoff. This last mentioned patent describes the provision of an improved method in which getter materials are flashed outside of the evacuated space. Getter atoms are formed into a beam directed toward a predetermined region for deposition of a film of getter material on this predetermined region within the lasing cavity.

Although the getter concepts and techniques described above are useful, they do not particularly lend themselves to very small ring laser cavities in which a polygonal lasing path is in the order of an inch or less on each leg of the polygonal path. This is so since the entrance to the lasing cavity via the laser block is very small.

A BRIEF DESCRIPTION OF THE INVENTION

An object of the invention is to provide a getter assembly which may be attached to a laser block in which the getter materials contained within the getter assembly is prevented from entering into the lasing cavity itself.

In the present invention, a getter assembly is formed by a housing containing a cavity in which the passageway into the cavity is covered by an end cover which is permeable to selected gasses. Internal to the cavity formed by the housing is an activated getter material for eliminating selected gas contaminants within the cavity.

A BRIEF DESCRIPTION OF THE DRAWINGS

A DETAILED DESCRIPTION OF THE INVENTION

Figure 1:
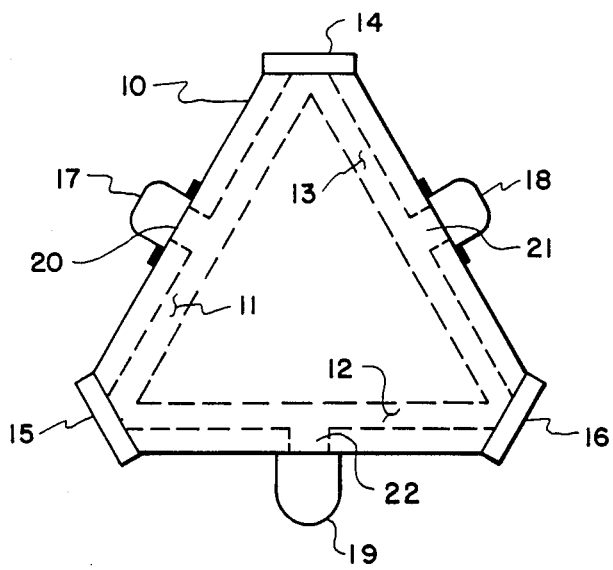
FIG. 1 is a schematic drawing of a ring laser angular rate sensor employing the getter assembly of the present invention.

Referring now to FIG. 1 of the drawings, a laser block 10 such as that shown in U.S. Pat. No. 3,390,606 includes a ring lasing cavity comprised of a laser block 10 having interconnected tunnels 11, 12 and 13. The sensor also includes mirrors 14, 15 and 16 for allowing the generation and the propagation of laser beams to propagate along the interconnected tunnels. Further, anodes 17 and 18, and cathode 19 are adapted to be connected to a source of electrical energy for establishing an ionization current which in turn establishes counter propagating laser beams in a well known manner. Anode 17 is in communication with tunnel 11 via passageway 20, anode 18 is in communication with tunnel 13 via passageway 21, and cathode 19 is in communication with tunnel 12 via passageway 22. Passageways 20, 21 and 22 allow the free mobility of the lasing gas to flow about the tunnels and the passageways for communication with the pair of anodes and cathode as is well known.

Figure 2:
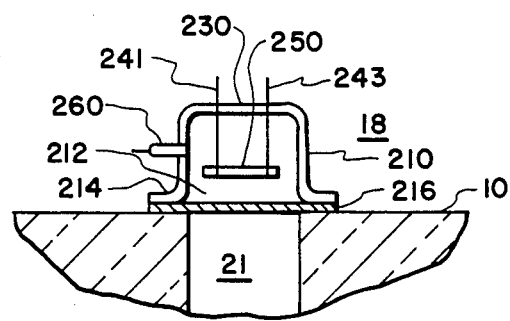
FIG. 2 is a cross section of the getter assembly in accordance with the present invention.

FIG. 2 describes in detail the getter assembly in accordance with the present invention which serves as a getter assembly and an anode 18 and/or 19. It should be understood by those skilled in the art that the getter assembly in accordance with the present invention could be used as a separate component and not serve a dual function as an anode. Nevertheless the getter assembly shall be described here in its dual function capacity.

Figure 3:
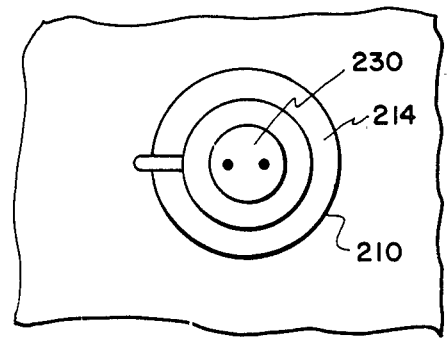
FIG. 3 is a side view of the getter assembly fixed to a laser block.

The getter assembly as illustrated in FIG. 2 is comprised of a housing 210 for forming a cavity 212. Housing 210 is shown to be cylindrically shaped in FIG. 2, but is only exemplary, and it should be understood that the shape of the housing and the cavity is not critical to the invention herein. The housing as is shown in FIG. 2 and the side view shown in FIG. 3 could include a mounting flange 214. Attached to the mounting flange is an end cover 216 for completely covering the passageway into cavity 212. The end cover may, by way of example, be welded to the housing flange 214. The top of the housing includes an insulator material 230 which allows passage of electrodes 241 and 243 to be in communication with cavity 212. Connected between electrodes 241 and 243 within cavity 212 is a getter material 250 suspended within cavity 212. The end cover 216 and insulator 230 are attached to housing 210 to form a gas tight cavity 212. Further, electrodes 241 and 243, passing through insulator 230 are also constructed to insure a gas tight cavity 212. Lastly, a pinch tube 260 is welded to housing 210 for purposes as will be described.

The getter assembly is prepared for operation by first evacuating the cavity 212 of any gas via pinch tube 260. Pinch tube 260 may be connected to any means for producing a vacuum and evacuating cavity 212 of any gas and creating a vacuum therein. After this function has been accomplished, pinch tube 260 is simply pinched in a manner well known in the art to form a gas tight cavity 212.

Next, electrodes 241 and 243 are electrically connected to a suitable source of energy for flashing the getter material 250 in a well known manner. Flashing of the getter material will activate the getter material within cavity 212. It should be noted that the getter material 250 may be activated in a manner other than flashing. For example the getter material 250 may be a bulk variety and that electrodes 241 and 243 are connected to a source of energy for heating the bulk material which is activated by the heating step. The getter material may be of any suitable type for serving the intended function, and may be shaped as a rod or disk and the like.

The getter assembly is illustrated in FIG. 2 to be attached to the laser block 10 by any suitable means. The getter assembly must be attached to laser block 10 so as to seal connecting passageway 21 and thereby allow the end cover to be in communication with any gas in passageway 21.

After attachment of the various components which make up a ring laser angular rate sensor, specifically the mirrors, the anodes, the cathodes, and the getter assembly in accordance with the present invention, the lasing cavity is also evacuated through a pinch tube (not shown) and filled with a lasing gas. It is at this time that the getter assembly 18 serves its intended function.

The end cover which serves as a cover of cavity 212 also serves as an end cover for passageway 21. The material and thickness of end cover 216 is chosen to be permeable to gas in very minute quantities. Preferably the end cover is very thin and allows the hydrogen to diffuse through the cover and be exposed to the surface within cavity 212. For example, Zirconium is a material which can serve the intended function of end cover 216. In its intended operation, minute quantities of the hydrogen contaminant gas within lasing gas is allowed to molecularly pass through end cover 216 in order to be neutralized by the getter material within cavity 212. Thus, in this manner the gas contaminants can be eliminated from the lasing cavity. Because of the "sealing" function of end cover 216, no particulate getter material matter can ever enter into the passageways and interconnected cavities of laser block 10.

End cover 216, if made of an electrically conductive material such as Zirconium can also serve as one of the electrodes which establishes the ionization of the lasing gas. Preferably, the getter assembly can serve as an anode for the ring laser angular rate sensor.

Those skilled in the art will recognize that only the preferred embodiments of the invention are disclosed herein and that the embodiment may be altered and modified without departing from the true spirit and scope of the invention as defined in the accompanying claims.

The embodiments of the invention in which an exclusive property or right is claimed are defined as follows:

1. A getter assembly for use in a gas discharge device comprising:
    a housing forming a cavity including a passageway into said cavity;
    an end cover for covering said passageway, said end cover being comprised of a gas permeable material; and
    an activated getter material in said cavity for eliminating selected gas contaminants within said cavity, said getter material being adapted to be electrically connected between first and second electrodes disposed within said cavity.

2. The apparatus of claim 1 wherein said housing includes an insulating material through which said first and second electrodes pass therethrough.

3. The assembly of claim 1 wherein said end cover is comprised of Zirconium.

4. A ring laser angular rate sensor comprising:
    a laser block having a plurality of interconnected cavities forming a polygonal closed loop path;
    at least a first passageway in communication with said interconnected cavities and an end surface of said block; and
    a getter assembly including,
        a housing forming a cavity including a passageway into said cavity;
        an end cover for blocking said passageway, said end cover being comprised of a gas permeable material, and
        an activated getter material in said cavity for eliminating selected gas contaminants within said cavity, said getter material being adapted to be electrically connected between first and second electrodes disposed within said cavity.

5. The sensor of claim 4 wherein said end cover is electrically connected to a source of energy for permitting an electrical current to pass therefrom to another electrode in communication with said gas.

* * * * *